United States Patent Office 3,681,128
Patented Aug. 1, 1972

3,681,128
PROCESS FOR FINISHING WOOL
Alfred Berger and Heinz Abel, Reinach, Basel-Land, and Alberto Deflorin, Riehen, Switzerland, assignors to Ciba-Geigy AG, Basel, Switzerland
No Drawing. Filed Jan. 2, 1970, Ser. No. 429
Claims priority, application Switzerland, Jan. 13, 1969, 374/69; Mar. 18, 1969, 4,087/69
Int. Cl. D06m 15/60
U.S. Cl. 117—141            10 Claims

ABSTRACT OF THE DISCLOSURE

A process for finishing wool, preferably for rendering wool non-felting, is provided. The wool is treated with an aqueous preparation containing a reaction product of basic polyamides and polyfunctional compounds and afterwards dried. The process is carried out at 35 to 100° C. and preferably according to the exhaustion method. The wool treated in this way is non-felting. This finishing process advantageously can be combined with a dyeing process.

---

The subject of the invention is a process for finishing wool, preferably for rendering wool non-felting, characterised in that the wool is treated at 35 to 100° C. with aqueous preparations which contain a reaction product of (a) basic polyamides which are obtained by condensation of (a') polymeric, preferably dimeric to trimeric, unsaturated fatty acids and (b') polyalkylenepolyamines with (b) polyfunctional, preferably difunctional compounds which as functional groups or atoms possess mobile halogen atoms, vinyl, acid, ester, acid anhydride or isocyanate groups or at most one epoxide group together with other functional groups or atoms of the indicated nature, with the equivalent ratio of the amino groups of component (a) to the functional groups or atoms of component (b) being 1:1 to 10:1 and the pH-value of the reaction mixture of the components (a) and (b) being adjusted, not later than after completion of the reaction, to a value of 2 to 8, and that after the treatment the wool is dried.

By one amino equivalent there is to be understood the amount of polyamide in grams which is equivalent to one mol of monoamine. Preferably, the equivalent ratio of (a):(b) is 4:1 to 8:1.

The polyfunctional, preferably difunctional, compounds which are required for the manufacture of the reaction product to be used according to the invention (=component (b)) preferably contain, as functional groups or atoms, halogen atoms bonded to an alkyl residue, or acid, ester acid, anhydride or isocyanate groups or at most one epoxide group together with other functional groups or atoms of the indicated nature.

In particular, difunctional components (b) are of interest which contain, as functional groups or atoms, halogen atoms bonded to an alkyl or aryl residue, carboxylic acid, carboxylic acid ester, carboxylic anhydride or isocyanate groups or at most one epoxide group together with another functional group or another atom of the indicated nature.

Particularly suitable difunctional components (b) are those which as functional groups or atoms contain chlorine or bromine atoms bonded to an alkyl residue, carboxylic acid, carboxylic acid ester or isocyanate groups or at most one epoxide group together with another functional group or another atom of the indicated nature.

Advantageously, phthalic acid alkyl esters, halogenacetic acid alkyl esters, alkylene dihalides, alkylene diisocyanates or epihalogenohydrins, wherein the alkyl or alkylene residues contain 1 to 6 carbon atoms and the halogen atoms represent chlorine or bromine atoms, are above all used as difunctional components (b).

As possible component (b) for the manufacture of the reaction products to be used according to the invention there may here for example be mentioned specifically: phthalic acid, preferably in the form of phthalic anhydride, phthalic acid esters such as for example phthalic acid dimethyl ester, adipic acid or sebacic acid or their esters, chloracetic acid, chloracetic acid methyl ester; ethylene dichloride, ethylene dibromide, propylene dichloride, 1,4-dichlorobutene-(2), dichlorethyl ether, epichlorhydrin, epibromhydrin; hexamethylene - 1,6 - diisocyanate, N,N'-methylene-bisacrylamide, and furthermore also naphthalene-1,4,5,8-tetracarboxylic acid, citric acid, divinylbenzene, ethylene glycol diacrylate or a compound of formula (1) 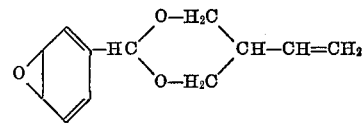

Aliphatic, ethylenically unsaturated dimeric to trimeric fatty acids have proved to be very suitable components (a'). Preferably, the reaction products (a) are here manufactured from the polyalkylenepolyamines (b') and aliphatic unsaturated dimeric to trimeric fatty acids (a') which are derived from monocarboxylic acids with 16 to 22 carbon atoms. These monocarboxylic acids are fatty acids with at least one and preferably 2 to 5 ethylenically unsaturated bonds. Representatives of this class of acids are for example oleic acid, hiragonic acid, elaeostearic acid, licanic acid, arachidonic acid, clupanodonic acid and especially linoleic and linolenic acid. These fatty acids can be obtained from natural oils, wherein they primarily occur as glycerides.

The dimeric to trimeric fatty acids (a') used according to the invention are obtained in a known manner by dimerisation of monocarboxylic acids of the indicated nature. The so-called dimeric fatty acids always show a content of trimeric acids and a small content of monomeric acids.

Dimerised to trimerised linoleic or linolenic acid are particularly suitable as component (a'). The commercial products of these acids as a rule contain 75 to 95% by weight of dimeric acid, 4 to 25% by weight of trimeric acid and from a trace up to 3% of monomeric acid. The molar ratio of dimeric to trimeric acid is accordingly about 5:1 to 36:1.

The polyamides are obtained by condensation of the polymerised fatty acids, especially of a dimerised to trimerised linoleic or linolenic acid, with polyamines, especially aliphatic polyamines such as diethylenetriamine, triethylenetetramine and tetraethylenepentamine, that is to say amines of formula (2)    $H_2N-(CH_2-CH_2-NH)_n-CH_2-CH_2-NH_2$ wherein $n$ equals 1, 2 or 3 and can, in the case of mixtures, also assume a non-integral average value, for example between 1 and 2. These polyamides must be basic, and this is achieved by employing an excess of amino groups ($H_2N-$ and alkylene—NH—alkylene) in comparison to the carboxylic acid groups in the polyamide condensation.

In addition to the components (a) and (b) the reaction products can also further be built up from an additional third component (c), namely monofunctional compounds which as functional groups or atoms possess a mobile halogen atom or a vinyl, acid, ester, acid anhydride, isocyanate or epoxide group. Appropriately, about 0.25 mol of the monofunctional component (c) are employed per one amino group equivalent of the component (a), but this content can also be increased up to, for example, 0.5 mol per amino group equivalent. These monofunctional compounds [=component (c)] are preferably aryl or aralkyl halides, nitriles or amides of acids of the acrylic acid series, aliphatic or aromatic carboxylic acids, their esters and anhydrides as well as aliphatic or aromatic isocyanates or epoxides.

Advantageously, the following are used as monofunctional components (c): alkyl halides such as ethyl bromide or butyl chloride, aralkyl halides such as benzyl chloride; nitriles or amides of acrylic acid or methacrylic acid such as acrylonitrile or acrylic acid amides; alkanecarboxylic acids with up to 18 carbon atoms such as coconut fatty acid or stearic acid, or their esters with alcohols which contain at most 5 carbon atoms, for example methanol, ethanol or n-butanol; aromatic isocyanates such as phenyl-isocyanate; or aliphatic or aromatic epoxides such as propylene oxide, butylene oxide, dodecene oxide or styrene oxide.

Particularly suitable components (c) are alkylene oxides with at most 12 carbon atoms, alkanecarboxylic acids with at most 18 carbon atoms, monocyclic aralkyl halides or acrylonitrile.

In the case of the conjoint use of a monofunctional component (c) the sequence in which the reaction of the polyamides with the monofunctional and polyfunctional compounds takes place is of subordinate importance. It is possible first to react the polyamides with a monofunctional compound and then with the polyfunctional compound, or also vice versa. In some cases, that is to say if there are no great differences in reactivity, the reaction can also be carried out simultaneously.

Preferably, the reaction of the components (a), (b) and (c) is, where appropriate, generally carried out by first taking the basic polyamide and, where appropriate, slowly introducing the monofunctional compound at temperatures of between 20 and 100° C. whilst stirring. After this the reaction is then continued in 1 to 5 hours at temperatures of up to 200° C. or even above and the reaction is then carried out in the same manner with the polyfunctional compound.

The resulting products are sparingly soluble in water and are strongly basic. By neutralisation with an acid, preferably acetic acid, the products are converted into salts which dissolve in water and are used in aqueous solution for rendering wool non-felting.

In detail, the procedure for the manufacture of the reaction products depends entirely on the reactivity of the monofunctional and polyfunctional compounds with the amino groups of the basic polyamides. The relatively inert dicarboxylic acids can for example be added relatively rapidly to the polyamide at 80 to 100° C., after which the reaction is completed in 2 to 4 hours at 150 to 170° C., with the water of reaction escaping. The more reactive esters or alkylene dihalides are advantageously dissolved beforehand in an organic solvent such as for example isopropanol, butyl glycol or diethylene glycol monobutyl ether and the solution is added dropwise at between 60 and 100° C. over the course of, for example, 4 hours, after which the reaction is further allowed to go to completion at about 100° C.

The conjoint use of solvents results in the metering of the addition being kept under better control and more homogeneous reaction products being obtained thereby. It is sometimes of advantage also initially to dissolve the polyamide taken in an organic solvent, for example those mentioned above. This is particularly advantageous where the reaction mixture would otherwise become too viscous, so that difficulties in stirring could arise and uniform reaction would become doubtful. This is particularly applicable to the extraordinarily reactive isocyanates.

When using the isocyanates it is furthermore advisable not to treat the reaction products with, for example, acetic acid but to react the polyamide in the form of the acetic acid salt with the isocyanate. The quantity ratios in which the functional compounds are reacted with the polyamide can vary within rather wide limits. When using difunctional components (b) suitable products are in general obtained if 2 to 20 amine equivalents of the polyamide are used per 1 mol (2 "reactive equivalents") of the difunctional compound. Fundamentally, however, the quantity ratio must be so chosen within this framework that taking into account the acid, preferably acetic acid, required for the neutralisation, products which are easily soluble in water are produced. The more reactive the monofunctional or polyfunctional compound is, the greater is the danger that the reaction does not take place sufficiently uniformly and that the resulting end product contains considerable proportions of insoluble material which can only be separated off with difficulty. In this case it is advantageous to use larger amounts of polyamide. In the case of diisocyanates, for example, 12 to 20, preferably 16, amine equivalents of the basic polyamide are therefore advantageously used per 1 mol of diisocyanate.

For rendering wool non-felting, the aqueous liquor can, in addition to the preparation of the reaction product, if desired, contain yet further additives such as wetting agents and dispersing agents. The process for dyeing wool and rendering it non-felting, in which, successively and in optional sequence, the wool is on the one hand dyed by the exhaustion method and is on the other hand treated at temperatures of 35 to 100° C. and pH-values of 3 to 9 with the preparations from the reaction products proves to be particularly advantageous. Dyeing and rendering non-felting can thus be combined in a simple manner and carried out in the same apparatus without the wool being taken out of the apparatus between the two processes.

Dyeing can here be carried out in the usual manner which is in itself known, using any desired dyestuffs which can be used for wool, for example acid wool dyestuffs, 1:1- or 1:2-metal complex dyestuffs or reactive dyestuffs. Equally, the additives which are customary when dyeing wool can be employed, such as sulphuric acid, acetic acid, sodium sulphate, ammonium sulphate and levelling agents, possible levelling agents being above all polyglycol compounds of higher aliphatic amines, which can optionally also be quaternised and/or esterified at the hydroxyl groups by means of polybasic acids.

The liquor which serves for rendering the material non-felting contains, in addition to the preparation of the reaction product, also the acid required for adjusting the acid medium. Preferably, however, the process is carried out in a weakly alkaline range from about pH 8 to 9, with ammonia or salts which react alkaline, such as for example trisodium phosphate, being added to the liquor.

Additionally, yet further salts such as sodium sulphate, ammonium sulphate or sodium thiosulphate can be conjointly used.

The amount of reaction product (solvent and water not being included in the calculation) relative to the weight of the wool is appropriately 0.5 to 5%. As has been mentioned, the process is carried out at temperatures of 35 to 100° C. and here between 10 and 80 minutes are in most cases required for a far-reaching to practically complete fixing of the reaction product.

The sequence of the two processes is optional; in general it is rather more advantageous to dye first and then to render the material non-felting. The combined process for dyeing wool and rendering it non-felting is especially well suited to actual machine dyeing, where the goods being dyed are static and the liquor is moved.

The present wool-finishing process preferably is carried out according to the exhaustion method.

In the manufacturing instructions and examples which follow, parts (P) and percentages denote parts by weight and percentages by weight. The relationship of parts by volume (PV) to parts by weight is as of the ml. to g.

MANUFACTURING INSTRUCTIONS (A) 98.8 parts of a condensation product of polymerised linoleic acid and diethylenetriamine (0.4 amine equivalent) are warmed to 90–95° C. whilst stirring. 9.8 parts of phthalic acid dimethyl ester (0.05 mol) dissolved in 30 P of n-butyl-glycol are added dropwise over the course of 4 hours, and the mixture is kept at 95–100° C. for a further 3 hours, mixed with 24 P of glacial acetic acid and then dissolved in 498 parts of water, whereby a clear slightly viscous preparation (A) is obtained.

(B) 98.8 parts of a condensation product of polymerised linoleic acid and diethylenetriamine (0.4 amine equivalent) are warmed to 55–60° C. whilst stirring. A solution of 5.6 parts of chloroacetic acid methyl ester (0.05 mol) in 30 P of butylglycol is added dropwise over the course of 4 hours. Thereafter the mixture is warmed in 30 minutes from 60° C. to 95°–100° C., kept for 2 hours at this temperature, mixed with 24 P of glacial acetic acid and dissolved in 480 parts of water. A clear slightly viscous solution is obtained (=preparation (B)).

(C) 98.8 parts of a condensation product of polymerised linoleic acid and diethylenetriamine (0.4 amine equivalent) are treated with 24 parts of glacial acetic acid at 50 to 60° C. over the course of 15 minutes and then dissolved in 100 PV of acetone. A solution of 4.2 parts of hexamethylene-1,6-diisocyanate (0.025 mol) in 100 PV of acetone is added dropwise in 4½ hours at 35° C. Thereafter the mixture is warmed to 60° C. for 1 hour and kept for 2 hours at 60 to 65° C. The acetone is thereafter very largely distilled off in vacuo at 60° C. The residue is dissolved in water, adjusted to a final weight of 1270 parts, and freed of traces of insoluble material by filtration (=preparation (C)).

(D) 98.8 parts of a condensation product of polymerised linoleic acid and diethylenetriamine (0.4 amine equivalent) are warmed to 90–95° C. and added dropwise over the course of 4 hours, whilst stirring, to 9.4 parts of ethylene dibromide (0.05 mol) dissolved in 30 P of n-butylglycol. Thereafter the mixture is kept for a further 2 hours at 95 to 100° C. and is then treated with 24 parts of glacial acetic acid. It is then dissolved in 492 parts of water (=preparation (D)).

(E) Procedure (D) is followed but instead of ethylene dibromide 4.8 parts of epichlorhydrin (0.05 mol) are used and the product is finally dissolved in 480 parts of water (=preparation (E)).

(F) 98.8 parts of a condensation product of polymerised linoleic acid and diethylenetriamine (0.4 amine equivalent) are warmed to 60° C. whilst stirring. Thereafter 3.5 parts (0.081 equivalent, or 0.027 mol) of cyanuric acid are introduced over the course of 30 minutes and the mixture is heated to 155–160° C. in 1 hour and kept for 3 hours at about 160° C. at 20 mm. Hg. It is now cooled to 100° C., mixed with 24 parts of glacial acetic acid and then dissolved in 504 parts of water (=preparation (F)).

(G) 98.8 parts of a condensation product of polymerised linoleic acid and diethylenetriamine (0.4 amine equivalent) are heated to a temperature of 180 to 190° C. under nitrogen. 20.8 parts of dodecene oxide (0.1 mol) are added dropwise in 2 hours and the mixture is kept for a further 2 hours at 180 to 190° C., then cooled to 100° C. and mixed with 24 parts of glacial acetic acid. Thereafter the mixture is cooled further and dissolved in 120 parts of acetone. At 35° C., a solution of 4.2 parts of hexamethylene-diisocyanate (0.025 mol) in 100 g. of acetone is then added dropwise in 4 to 5 hours and the mixture then kept at 60° C. for 2 hours. Thereafter the acetone is very largely distilled off in vacuo and the residue is dissolved in water and adjusted to a final weight of 1280 parts.

(H) 98.8 parts of a condensation product of polymerised linoleic acid and diethylenetriamine (0.4 amine equivalent) are warmed to 60° C. and 22 parts of coconut fatty acid (0.1 mol) and 10.2 parts of sebacic acid (0.05 mol=0.1 equivalent) are introduced in 30 minutes. Thereafter the mixture is heated to 155–160° C. in 1 hour and kept for 3 hours at 155 to 160° C. and 20 mm. Hg under a descending condenser. It is then cooled to about 100° C., neutralised with 7 parts of glacial acetic acid and dissolved in 600 parts of water.

(I) 98.8 parts of a condensation product of polymerised linoleic acid and diethylenetriamine (0.4 amine equivalent) are warmed to 50° C. 5.4 parts of acrylonitrile (0.1 mol) are added dropwise in 30 minutes and the mixture is kept for a further 30 minutes at 50 to 60° C. Thereafter a solution of 4.8 parts of epichlorhydrin (0.05 mol) in 20 parts of n-butylglycol is added dropwise in 30 minutes and the mixture is warmed to 95–100° C. in 1 hour and kept for 2 hours at this temperature. Thereafter it is treated with 24 parts of glacial acetic acid and dissolved in 480 parts of water, whereupon a thick paste is obtained which is easily soluble in water.

(J) 98.8 parts of a condensation product of polymerised linoleic acid and diethylenetriamine (0.4 amine equivalent) are warmed to 50–60° C. 12.8 parts of benzyl chloride (0.1 mol) are added dropwise in 30 minutes and the mixture is then warmed for 2 hours on a boiling water-bath. Thereafter a solution of 9.8 parts of phthalic acid dimethyl ester (0.05 mol) dissolved in 30 parts of n-butylglycol is added dropwise in 30 minutes and the mixture warmed for a further 3 hours on a boiling waterbath. It is now treated with 17.6 parts of glacial acetic acid until a pH-value of 6 to 7 is reached and dissolved in 498 parts of water. A flowable paste which easily dissolves in water is obtained.

(K) Following the data in manufacturing instruction (A), 98.8 parts of a condensation product of polymerised linoleic acid and diethylenetriamine (0.4 amine equivalent) are reacted with 19.4 parts of phthalic acid dimethyl ester (0.1 mol). Thereafter 31 parts of glacial acetic acid are added and the mixture dissolved in 566 parts of water (=preparation (K)).

(L) Manufacturing instruction (K) is followed but 38.8 parts of phthalic acid dimethyl ester (0.2 mol) are used, and the mixture is then treated with 24 parts of glacial acetic acid and dissolved in 616 parts of water (=preparation (L)).

(M) 8.0 parts (0.05 mol) of phthalic anhydride are introduced in 30 minutes at 60° C. into 98.8 parts of a condensation product from a polymerised linoleic acid and diethylene-triamine (0.4 amine equivalent). Thereafter the mixture is heated to 155–160° C. in 1 hour and kept for 3 hours at this temperature and 20 mm. pressure. 24 parts of glacial acetic acid are then added at 80° C. and the mixture dissolved in 524 parts of water (=preparation (M)).

Compounds of similar activity are obtained if instead of phthalic anhydride 7.6 parts (0.025 mol) of naphthalene-1,4,5,8 - tetracarboxylic acid (=preparation (M–1)) or 5.2 parts (0.027 mol) of citric acid (=preparation (M–2)) are used.

(N) 98.8 parts of a condensation product of polymerised linoleic acid and diethylenetriamine (0.4 amine equivalent) are warmed to 40–45° C. and then introduced in the course of 30 minutes into 7.5 parts of N,N'-methylene-bis-acrylic acid amide (0.05 mol). The mixture is further stirred for 1 hour at 40 to 45° C., then for 1 hour at 60° C. and then for a few minutes on a boiling waterbath. Thereafter it is treated with 24 parts of glacial acetic acid and dissolved in 520 parts of water (=preparation (N)).

Compounds of similar activity are obtained if instead of the N,N'-methylene-bis-acrylic acid amide 7.2 parts of ethylene glycol diacrylate (which yields preparation (N–1)) or 6.6 parts of divinylbenzene (which yields preparation (N–2)) are used. Here the dropwise addition of the n-butyl-glycol solution takes place over the course of 4 hours at 35 to 45° C. and subsequently the reaction mixture is warmed on a boiling waterbath for 1½ hours.

It is furthermore possible to use 10.2 parts of the compound of Formula 1 instead of the N,N'-methylene-bis-acrylic acid amide (which yields preparation (N-3)). The dropwise addition of the n-butylglycol solution here takes place over the course of 4 hours at 75 to 80° C. and subsequently the reaction mixture is warmed on a waterbath for 2 hours.

(O) Following the data in manufacturing instruction (C), 73.2 parts of a condensation product of a polymerised linoleic acid and polyamines (mixture of diethylenetriamine and triethylenetetramine) having an amine equivalent weight of 183 are reacted with 4.2 parts of hexamethylene-1,6-diisocyanate (0.025 mol) and the mixture adjusted with water to a final product of 1000 parts (=preparation (O)).

(P) 236 parts of a condensation product of polymerised linoleic acid and diethylenetriamine having an amine equivalent weight of 590 are reacted with 4.2 parts of hexamethylene-1,6-diisocyanate (0.025 mol) in accordance with the data in manufacturing instruction C and the mixture then adjusted to a final weight of 2640 parts (=preparation (P)).

(Q) 145 parts of the condensation product described below (0.4 amine equivalent) are reacted with 4.2 parts of hexamethylene-1,6-diisocyanate (0.025 mol) in accordance with the data in manufacturing instruction (C), and adjusted to a final weight of 1750 parts.

The condensation product is manufactured in the following manner:

187 parts of polymerised fatty acid and 68.5 parts of diethylenetriamine are introduced into a reaction vessel which is provided with a stirrer, a thermometer, an inlet tube for nitrogen and a distillation head. The polymerised fatty acid, obtained by polymerisation of oleic acid, has the following properties: 95% dimerised oleic acid; equivalent weight 289. The reaction mixture is heated to 200° C. over the course of 1½ hours under a nitrogen atmosphere and whilst stirring, with the elimination of water starting at 160° C. internal temperature. After a further 2 hours at 200° C. a total of 13 parts of water are collected.

Thereafter the mixture is concentrated for 3 hours in vacuo (14 mm. Hg) at 200 to 210° C. 210 g. of a viscous yellowish clear product having an amine equivalent weight of 363 are obtained.

(R) 98.8 parts of a condensation product of polymerised linoleic acid and diethylenetriamine (0.4 amine equivalent) are warmed to 95–100° C. A solution of 7.2 parts of dichlorethyl ether (0.05 mol) in 30 parts of butylglycol is added dropwise over the course of 4 hours, and the mixture is kept for a further 2 hours at 120° C., then treated with 24 parts of glacial acetic acid at 80 to 90° C., and dissolved in 490 parts of water.

(S) 5.4 parts of 1,4-dichlorobutene-(2) (0.05 mol) dissolved in 30 parts of butylglycol are added dropwise over the course of 4 hours at 60° C. to 98.8 parts of a condensation product of polymerised linoleic acid and diethylenetriamine (0.4 amine equivalent). The material hereupon becomes very viscous and is therefore gradually diluted with 60 parts of butylglycol. It is then treated with 24 parts of glacial acetic acid and dissolved in 426 parts of water. Small amounts of undissolved material are removed by means of a cloth filter.

EXAMPLE 1

100 parts of wool are dyed in a circulation apparatus in the usual manner with a reactive dyestuff, and are then neutralised and rinsed. A fresh bath of 2000 parts of water is now provided, and 12 parts of preparation (A) are then allowed to run into the circulation apparatus. After uniform distribution of the preparation (A) and after a temperature of 50° C. has been reached, a solution of 5 parts of sodium thiosulphate in 20 parts of water is allowed to run in over the course of 20 minutes. Whilst running in the sodium thiosulphate solution the preparation (A) slowly precipitates and is uniformly absorbed on the wool fibres. A solution of 3 parts of trisodium phosphate in 10 parts of water is further added and the treatment continued for 30 minutes at 50° C. The wool is then rinsed and neutralised to pH 7 with acetic acid in the last rinsing bath. Thereafter the wool is dried for 1 hour at 80° C. The wool yarn manufactured from this wool is now non-felting in accordance with the specifications of the IWS 7 B.

Similar results are obtained if instead of the preparation (A) one of the preparations (B) to (F) is used.

EXAMPLE 2

100 parts of dyed wool yarn are wetted in 4000 parts of water at 50° C. in a rope dyeing apparatus. 20 parts of preparation (C) are then added and after it has been uniformly distributed a solution of 6 parts of trisodium phosphate in 20 parts of water is run in over the course of 20 minutes. Whilst running in the trisodium phosphate solution the preparation (C) slowly precipitates and is uniformly absorbed on the wool. Thereafter the treatment is continued for 30 minutes at 50° C. The wool is then rinsed and neutralised to pH 7 with acetic acid in the last rinsing bath. After centrifuging, the wool is dried for 1 hour at 80° C. The wool yarn is now non-felting according to the specifications of the IWS 7 B.

Similar results are obtained if instead of preparation C one of the preparations (A), (B), (D), (E) or (F) is used.

EXAMPLE 3

100 parts of cheeses of wool yarn dyed with reactive dyestuffs are wetted for 10 minutes in 1500 parts by volume of water at 50° C. in a circulation apparatus. 20 parts of the reaction product according to instruction (G) are then added. After uniform distribution of the reaction product, 4 parts of disodium phosphate dissolved in 20 parts by volume of water are run into the treatment bath over the course of 5 minutes. Thereafter 4 parts of trisodium phosphate, again dissolved in 20 parts by volume of water, are run in over the course of 15 minutes. After about 30 minutes 2 parts of a 12.5% strength solution of a condensation product of 1 mol of octadecyl alcohol and 35 mols of ethylene oxide are still added to the bath and the treatment continued for 15 minutes. The material is then thoroughly rinsed, centrifuged and dried for 1 hour at 80° C. The wool treated in this way is non-felting according to IWS Specifications 7 B.

The reaction products according to instructions (H), (I) and (J) give similar effects.

EXAMPLE 4

Using a rope dyeing apparatus, 100 parts of wool yarn are firstly dyed in the usual manner, preferably with reactive dyestuffs.

A fresh treatment bath of 3000 parts of water is then warmed to 40° C. 10 parts of preparation (O) are then added.

After the preparation has been distributed, 3 parts of 25% strength ammonia are run in. An emulsion forms, which is uniformly absorbed on the wool in about 20 minutes. When the bath is exhausted, a dilute solution of 4 parts of trisodium phosphate is further added and treatment continued for a further 20 minutes. The material is then rinsed and dried. The yarn is non-felting according to IWS Specifications 7 B.

Similar effects are obtained with preparation (P), (Q), (R), (S), (K), (L), (M) or (N).

What is claimed is:

1. Process for rendering wool non-felting, which comprises treating the wool at 35 to 100° C. with aqueous preparations which comprise a reaction product of (a)' basic polyamides which are obtained by condensation of (a') polymeric unsaturated fatty acids, which are derived from mono-carboxylic acids with 16–22 carbon atoms, and (b') polyalkylenepolyamines of formula $$H_2N-(CH_2-CH_2-NH)_n-CH_2-CH_2-NH_2$$

wherein $n$ is 1, 2 or 3, and of (b) poly-functional compounds which as functional groups or atoms possess mobile halogen atoms, vinyl, acid, ester, acid anhydride or isocyanate groups or at most one epoxide group together with other functional groups or atoms of the indicated nature, with the equivalent ratio of the amino groups of component (a) to the functional groups or atoms of component (b) being 1:1 to 10:1 and the pH-value of the reaction mixture of the components (a) and (b) being adjusted, not later than after completion of the reaction, to a value of 2 to 8, and after the treatment the wool is dried.

2. Process according to claim 1 wherein polyfunctional compounds are used as component (b), which as functional groups or atoms consist of halogen atoms bonded to an alkyl or aryl residue.

3. Process according to claim 1 for rendering wool non-felting, wherein as component (a') dimeric to trimeric unsaturated fatty acids are used.

4. Process according to claim 1 wherein (b) is a difunctional component consisting of halogen atoms bonded to an alkyl residue, carboxylic acid, carboxylic acid ester, carboxylic acid anhydride or isocyanate groups or at most one epoxide group together with another functional group or another atom of the indicated nature.

5. Process according to claim 1 wherein (b) is a difunctional component consisting of chlorine or bromine atoms bonded to an alkyl residue.

6. Process according to claim 1 wherein (b) is a difunctional component consisting of phthalic acid alkyl esters, halogenacetic acid alkyl esters, alkylene dihalide, alkylenediisocyanate or epihalogenohydrin, with the alkyl or alkylene residues consisting of 1 to 6 carbon atoms and the halogen atoms representing chlorine or bromine atoms.

7. Process according to claim 1 wherein, as component (a), a polyamide of dimerized to trimerized linoleic or linolenic acid is used.

8. Process according to claim 1 wherein the wool is treated with aqueous preparations which comprise a reaction product which in addition to the components (a) and (b) is built up of (c) monofunctional compounds possessing a mobile halogen atom, or a vinyl, acid, ester, isocyanate or epoxide group as functional groups or atoms.

9. Process according to claim 1, in which the amount of reaction product used relative to the weight of the wool is 0.5 to 5%.

10. Process according to claim 1, in which the wool is treated according to the exhaustion method.

References Cited

UNITED STATES PATENTS

| | | | |
|---|---|---|---|
| 3,049,445 | 8/1962 | Lundgren et al. | 8—128 X |
| 3,248,280 | 4/1966 | Hyland | 260—18 X |
| 3,434,984 | 3/1969 | Hyland | 260—18 |
| 2,663,649 | 12/1953 | Winkler | 260—18 UX |
| 3,431,132 | 3/1969 | Bacon et al. | 117—141 X |
| 2,303,364 | 12/1942 | Schirm | 8—116.2 |
| 3,462,284 | 8/1969 | Vertnik | 260—18 X |
| 3,493,426 | 2/1970 | Kamal | 117—141 X |
| 2,696,448 | 12/1954 | Hammer et al. | 117—161 X |
| 2,770,608 | 11/1956 | Barker et al. | 117—161 X |
| 2,450,940 | 10/1948 | Cowan et al. | 260—18 UX |

WILLIAM D. MARTIN, Primary Examiner

H. J. GWINNELL, Assistant Examiner

U.S. Cl. X.R.

117—161 F, UT, UC, KP